US010399376B2

(12) United States Patent
Seth

(10) Patent No.: US 10,399,376 B2
(45) Date of Patent: Sep. 3, 2019

(54) MULTI-LAYER DOUBLE STICK LAYERED PAD

(71) Applicant: Sandeep Seth, Bellaire, TX (US)

(72) Inventor: Sandeep Seth, Bellaire, TX (US)

( * ) Notice: Subject to any disclaimer, the term of this patent is extended or adjusted under 35 U.S.C. 154(b) by 0 days.

(21) Appl. No.: 15/629,269

(22) Filed: Jun. 21, 2017

(65) Prior Publication Data

US 2017/0361638 A1    Dec. 21, 2017

Related U.S. Application Data

(60) Provisional application No. 62/352,775, filed on Jun. 21, 2016.

(51) Int. Cl.
| | |
|---|---|
| *B42D 5/00* | (2006.01) |
| *F16B 11/00* | (2006.01) |
| *B42F 5/00* | (2006.01) |

(52) U.S. Cl.
CPC ............... *B42D 5/003* (2013.01); *B42F 5/00* (2013.01); *F16B 11/006* (2013.01)

(58) Field of Classification Search
USPC ............... 156/247, 249, 307.1, 307.3, 307.7
See application file for complete search history.

(56) References Cited

U.S. PATENT DOCUMENTS

| | | | | | |
|---|---|---|---|---|---|
| 2,227,444 | A | * | 1/1941 | Drew | C09J 7/205 |
| | | | | | 428/308.8 |
| 4,890,608 | A | * | 1/1990 | Steer | A61F 5/443 |
| | | | | | 602/52 |
| 5,707,713 | A | * | 1/1998 | Langan | G09F 3/10 |
| | | | | | 283/81 |

* cited by examiner

*Primary Examiner* — Sing P Chan
(74) *Attorney, Agent, or Firm* — C. Tumey Law Group PLLC

(57) ABSTRACT

A multi-layer pad of double-sided adhesive sheet material with individual pull-tabs. A method of making an adhesive sheet product may comprise: providing a first double-sided adhesive sheet having a first pull tab and a first adhesive strength on one side of the first double-sided adhesive sheet and a second adhesive strength on the other side of the first double-sided adhesive sheet; providing a second double-sided adhesive sheet having a second pull tab and a first adhesive strength on one side of the second double-sided sheet and a second adhesive strength on the other side of the second double-sided sheet; adhering the first double-sided adhesive sheet to the second double-sided sheet such that side with the second adhesive strength of the first double-sided adhesive sheet contacts the side with the first adhesive strength of the second double-sided adhesive sheet and such that the second pull tab is offset from the first pull tab; whereby a multi-layer double-sided adhesive pad is formed whereby the first double-sided adhesive sheet may be removed from the second double-sided adhesive sheet with the use of the first pull tab to expose the side having the first adhesive strength of the second double-sided adhesive sheet.

8 Claims, 3 Drawing Sheets

MULTI-LAYER DOUBLE STICK LAYERED PAD

CROSS-REFERENCE TO RELATED APPLICATIONS

This application is a Non-provisional of Provisional U.S. Application Ser. No. 62/352,775 filed Jun. 21, 2016, which is herein incorporated by reference in its entirety.

BACKGROUND

Adhesive sheet pads have been used to record notes and place those notes on a surface utilizing the adhesive on the sheet pad. However, once the adhesive sheet pad has been removed from a surface, the adhesive may no longer function to hold the adhesive sheet pad to the surface. Thus, there is a need for an adhesive sheet pad that may be utilized multiple times on multiple surfaces and maintain the ability to adhere to any number of surfaces without loss of adhesion.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
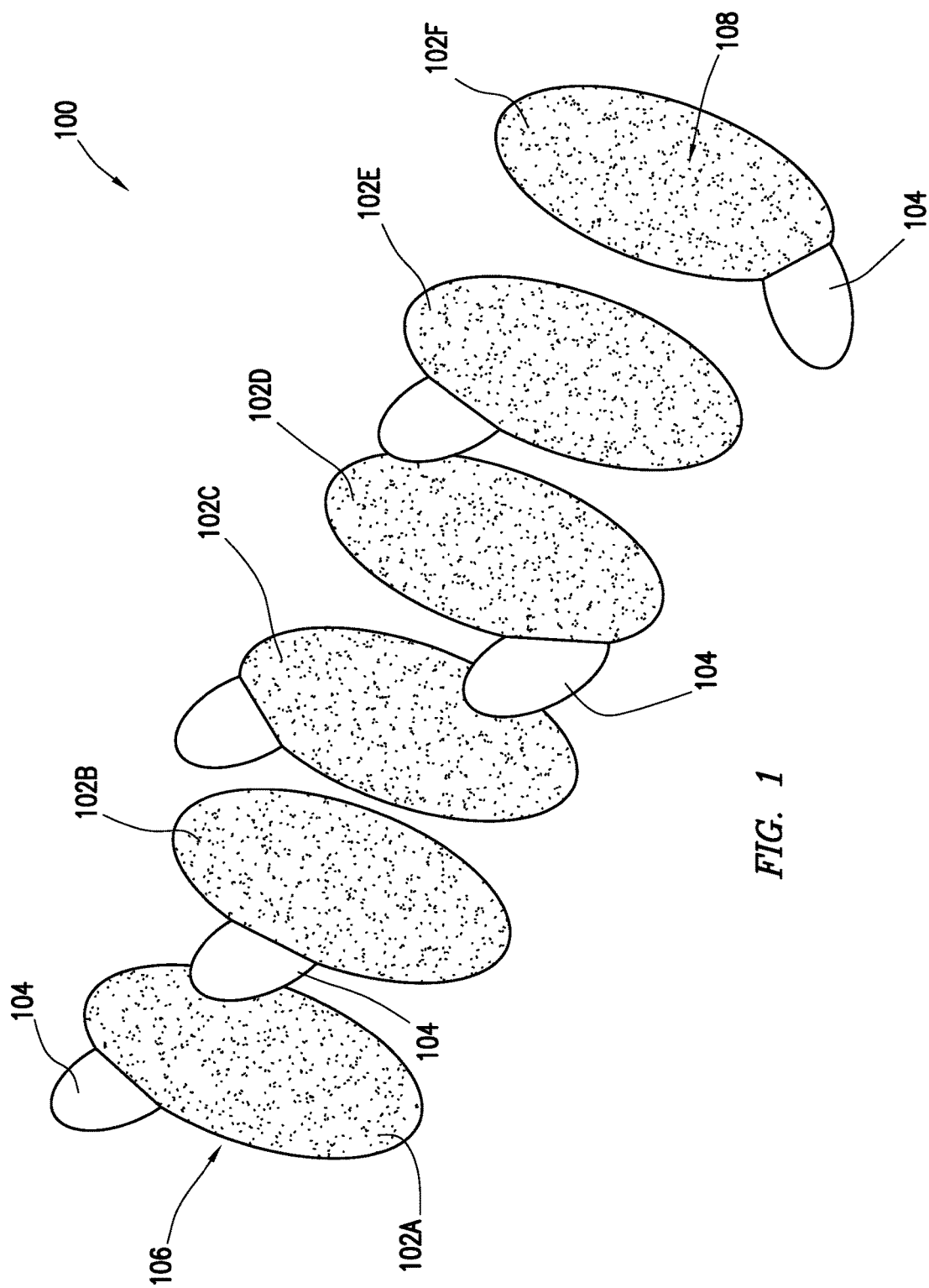
FIG. 1 illustrates an example embodiment of a multi-layer pad of double-sided adhesive sheet material with individual pull tabs.

The present disclosure may generally relate to a multi-layer pad of double-sided adhesive sheet material with individual pull tabs. Among other things, the multi-layer pad may allow an object to be restuck multiple times to a fixture by always providing fresh adhesive. Each time the object is to be restuck the user may peel off the old adhesive layer from the pad and uses a fresh adhesive layer. Without limitation, the multi-layer pad may be used in a residential or commercial building to attach various objects to a fixture, such as a wall, ceiling, or other fixture thereof. By way of example, the multi-layer pad may be used to attach objects, such as pictures, mirrors, camera, speakers, smoke detectors, motion detectors, and glass breakage detectors, among others. While the discussion herein, may describe attachment to an object and a fixture, it should understood that the multi-layer pad should not be limited to attachment of an object to a fixture. By way of example, the multi-layer pad may alternative be used to secure an object to a different object.

In some embodiments, each double-sided sheet forming a pad layer may have a different adhesive strength on each side. In some embodiments, when the pad side having the greater adhesive strength is stuck to an object and the other side stuck to a fixture, the object may be subsequently removed from the fixture, the spent pad layer may be peeled off and a fresh pad layer may be exposed to re-stick the object on the same or a different fixture or position. In some embodiments, when the pad side having the lesser strength is stuck to an object and the side having the greater adhesive strength is applied to a fixture, the object may be removed from the pad, the spent pad layer may be peeled off and a fresh pad layer may be exposed and the same or a new object may be stuck to the fresh layer.

An embodiment may provide a method of making an adhesive sheet product comprising: providing a first double-sided adhesive sheet having a first pull tab and a first adhesive strength on one side of the first double-sided adhesive sheet and a second adhesive strength on the other side of the first double-sided adhesive sheet; providing a second double-sided adhesive sheet having a second pull tab and a first adhesive strength on one side of the second double-sided sheet and a second adhesive strength on the other side of the second double-sided sheet; adhering the first double-sided adhesive sheet to the second double-sided sheet such that side with the second adhesive strength of the first double-sided adhesive sheet contacts the side with the first adhesive strength of the second double-sided adhesive sheet and such that the second pull tab is offset from the first pull tab; whereby a multi-layer double-sided adhesive pad is formed whereby the first double-sided adhesive sheet may be removed from the second double-sided adhesive sheet with the use of the first pull tab to expose the side having the first adhesive strength of the second double-sided adhesive sheet.

An embodiment may comprise a multi-layer double-side adhesive pad comprising: a first double-sided adhesive sheet having a first pull tab and a first adhesive strength on one side of the first double-sided adhesive sheet and a second adhesive strength on the other side of the first double-sided adhesive sheet; and a second double-sided adhesive sheet having a second pull tab and a first adhesive strength on one side of the second double-sided adhesive sheet and a second adhesive strength on the other side of the second double-sided adhesive sheet; wherein the second double-sided adhesive sheet is coupled to the first double-sided adhesive sheet such the side with the second adhesive strength of the first double-sided adhesive sheet contacts the side with the first adhesive strength of the second double-sided adhesive sheet and such that the second pull tab is offset from the first pull tab. Each pull tab may or may not have adhesive on one or more sides. Each pull tab may be integrally formed with a sheet or may be separate from the sheet and secured to the sheet in any suitable manner.

Referring now to FIG. 1, an embodiment of multi-layer pad 100 is illustrated. As illustrated, multi-layer pad 100 may include double-sided adhesive sheets 102a, 102b, 102c, 102d, 102e and 102f including individual pull-tabs 104. While FIG. 1 illustrates each of double-sided adhesive sheets having an individual pull-tab 104, it should be understood that the individual pull-tabs 104 may only be provided with one or more of the double-side adhesive sheets 102a, 102b, 102c, 102d, 102e, and 102f as desired for a particular application. As illustrated, the individual pull-tabs 104 may be offset from one another, for example, radially offset. Each double-sided adhesive sheet 102a, 102b, 102c, 102d, 102e and 102f may include a first side 106 and a second side 108 which may each have a different adhesive strength. For example, first side 106 may have a greater adhesive strength than second side 108. By way of example, first side 106 may have an adhesive strength that is greater than the adhesive strength of the second side by about 5% or more, about 10% or more, about 50% or more, or about 100% or more.

Use of multi-layer pad 100 to attach an object to a fixture will now be described in accordance with an example embodiment. In some embodiments, first side 106 of double-sided adhesive sheet 102a may be attached to an object. Second side 108 of double-sided adhesive sheet 102f may be attached to a fixture. It may be desired to remove the object from the fixture and re-attached to at a different position or to a different fixture. After removal of second side 108 of double-sided adhesive sheet 102f from the fixture, the spent sheet (e.g., double-sided adhesive sheet 102f) may be peeled off and a fresh double-sided adhesive sheet (e.g., double-sided adhesive sheet 102e) may be exposed to re-stick the object on the same or a different fixture or position. Individual pull tab 104 may be used to manually peel the spent layer to expose a fresh layer. In the alternative, it may be desired to remove the object from the multi-layer pad 100. This may enable another object to be attached to the fixture at the same position or use of the multi-layer pad 100 to attach another object to the fixture or a different fixture. After removal of the object from first side 106 of double-sided adhesive sheet 102a, the spent sheet (e.g., double-sided adhesive sheet 102a) may be peeled off and a fresh double-sided adhesive sheet (e.g., double-sided adhesive sheet 102b) may be exposed to re-stick another object to the multi-layer pad 100.

In some embodiments, second side 108 of double-sided adhesive sheet 102f may be attached to an object while the first side 106 of double-sided adhesive sheet 102a may be applied to a fixture. It may be desired to remove the object from the multi-layer pad 100 and attached a different object thereto. After removal of the object, the spent double-sided adhesive sheet (e.g., double-sided adhesive sheet 102f) may be peeled off and a fresh double-sided adhesive sheet (e.g., double-sided adhesive sheet 102e) may be exposed and the same or a new object may be stuck to the fresh double-sided adhesive sheet (e.g., double-sided adhesive sheet 102e).

Figure 2:
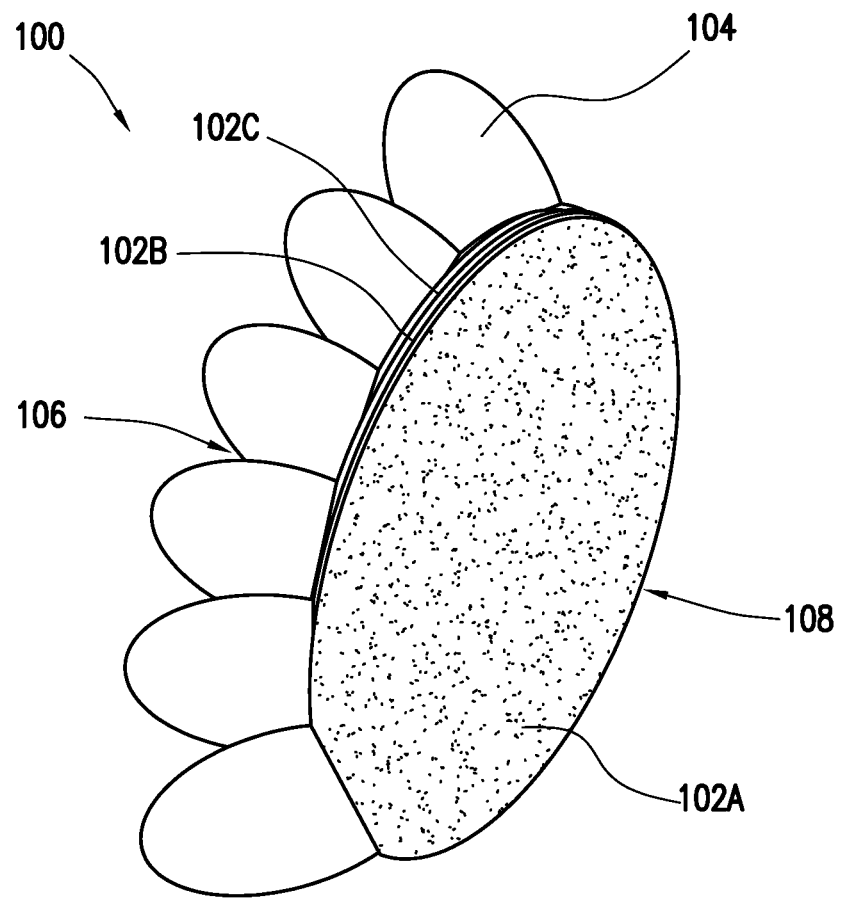
FIG. 2 illustrates another example embodiment of a multi-layer pad of double-sided adhesive sheet material with individual pull tabs.

Referring to FIG. 2, multi-layer pad 100 is shown in accordance with example embodiments. As illustrated, multi-layer pad 100 may include double-sided adhesive sheets 102a, 102b and 102c which may include radially offset pull tabs 104. Each double-sided adhesive sheet 102a, 102b and 102c may include sides 106, 108 which may each have a different adhesive strength. Side 106 may have a greater adhesive strength than side 108. Radially offset pull tabs 104 may be finger pull tabs which may be used to manually peel a spent double-sided adhesive sheet (e.g., double-sided adhesive sheet 102a) and expose a fresh double-sided adhesive sheet (e.g., double-sided adhesive sheet 102b). Side 106 may attach to an object, such as, for example, a smoke alarm, to be attached to a fixture, such as a wall. Side 108 may attach to a fixture, such as a wall.

Figure 3B:
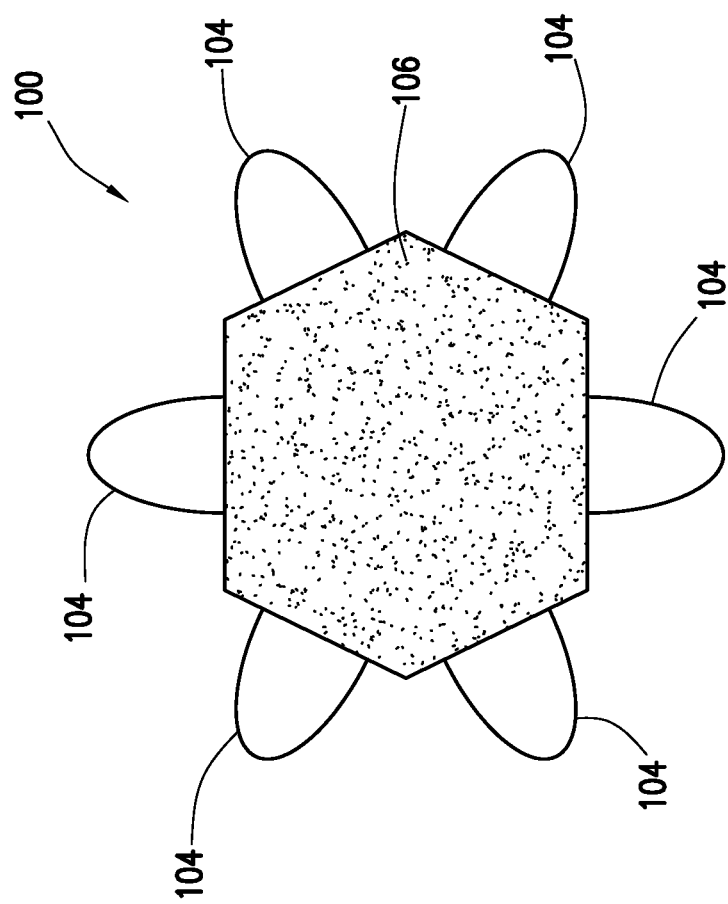
FIG. 3B illustrates an example embodiment of a cover sheet for a multi-layered pad of double-sided adhesive sheet material.
Figure 3A:
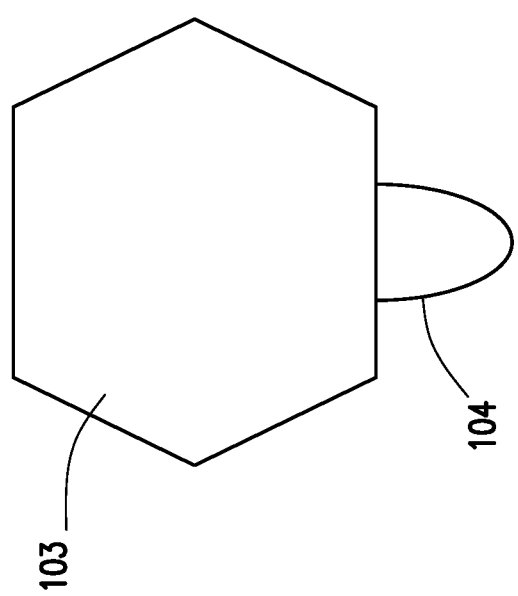
FIG. 3A illustrates another example embodiment of a multi-layer pad of double-sided adhesive sheet material with individual pull tabs.

Referring to FIG. 3A, multi-layer pad 100 is shown in accordance with example embodiments. As illustrated, multi-layer pad 100 may include double-sided adhesive sheets (e.g., 102a, 102b and 102c, as shown in FIG. 2) and non-adhesive front/back pad cover sheets 103 (FIG. 3B) with pull tabs 104. In some embodiments, the cover sheets 103 may have adhesive on the side facing the adhesive sheets and no adhesive on the opposite side. In other embodiments, the cover sheets 103 may have no adhesive on either side. In some embodiments, the cover sheets 103 may be placed on either side of the multi-layer pad 100 so that the adhesive is not exposed prior to use. The cover sheets 103 may be peeled from the front and back of the multi-layer pad 100 prior to its first use, for example, to expose the first adhesive double-sided sheet 106. The double-sided adhesive sheets (e.g., 102a, 102b and 102c, as shown in FIG. 2) may be clear or any color. The non-adhesive front/back pad cover sheets 103 may be clear or same or different color than the double-sided adhesive sheets (e.g., 102a, 102b and 102c, as shown in FIG. 2) forming the multi-layer pad 100. The multi-layer pad 100 may be any shape (e.g., polygon, oval, circular, elliptical, etc.) or any size depending on the object to be stuck. The multi-layer pad 100 may be thin. For example, the multi-layer pad 100 may have a thickness of from about 0.1 millimeter to about 5 centimeters. Each of the double-sided adhesive sheets (e.g., 102a, 102b, and 102c) may have a thickness of about 0.01 millimeters to about 1 centimeter. It should be understood that these size ranges are merely exemplary and the multi-layer pad 100 and double sided adhesive sheets (e.g., 102a, 102b, and 102c) may have sizes outside these disclosed ranges.

The present disclosure is illustrated herein by example, and various modifications may be made by a person of ordinary skill in the art. It is believed that the operation and construction of the present disclosure will be apparent from the foregoing description. While the apparatus and methods shown or described above have been characterized as being preferred, various changes and modifications may be made therein without departing from the spirit and scope of the disclosure as defined in the following claims.

What is claimed is:

1. A method of making an adhesive sheet product comprising:
    providing a first double-sided adhesive sheet having a first pull tab and a first adhesive strength on one side of the first double-sided adhesive sheet and a second adhesive strength on the other side of the first double-sided adhesive sheet;
    providing a second double-sided adhesive sheet having a second pull tab and a first adhesive strength on one side of the second double-sided adhesive sheet and a second adhesive strength on the other side of the second double-sided adhesive sheet; and
    adhering the first double-sided adhesive sheet to the second double-sided adhesive sheet such that the side with the second adhesive strength of the first double-sided adhesive sheet contacts the side with the first adhesive strength of the second double-sided adhesive sheet and such that the second pull tab is offset from the first pull tab;
    whereby a multi-layer double-sided adhesive pad is formed whereby the first double- sided adhesive sheet may be removed from the second double-sided adhesive sheet with the use of the first pull tab to expose the side having the first adhesive strength of the second double-sided adhesive sheet.

2. The method of claim 1, further comprising:
    providing a third double-sided adhesive sheet having a third pull tab and a first adhesive strength on one side of the third double-sided adhesive sheet and a second adhesive strength on the other side of the third double-sided adhesive sheet, and;
    adhering the second double-sided adhesive sheet to the third double-sided adhesive sheet such that side with the second adhesive strength of the second double-sided adhesive sheet contracts the side with the first adhesive strength of the third double-sided adhesive sheet and such that the third pull tab is offset from the second pull tab;
    whereby a multi-layer double-sided adhesive pad is formed whereby the second double- sided adhesive sheet may be removed from the third double-sided adhesive sheet with the use of the second pull tab to expose the side having the first adhesive strength of the third double-sided adhesive sheet.

3. The method of claim 2, further comprising:

providing one or more additional double-sided sheets, each additional sheet having its own pull tab and a first adhesive strength on one side of the additional sheet and a second adhesive strength on the other side of the additional sheet, and adhering each such additional sheet to the prior sheet of the pad such that the side of the prior sheet with the second adhesive strength contracts the side of the additional sheet with the first adhesive strength, and such that the pull tab of the additional sheet is offset from the pull tab of the prior sheet;

whereby a multi-layer double-sided adhesive pad is formed whereby each layer of the multi-layer double-sided adhesive pad can be removed by the use of its own pull tab to expose the next layer.

4. The method of claim 3, wherein the multi-layer double-sided adhesive pad is polygon shaped and each tab extends from a different side of the polygon than the prior tab.

5. The method of claim 3, wherein the multi-layer double-sided adhesive pad is circular or oval and each tab is radially offset from the prior tab.

6. The method of claim 3, wherein each tab displays a different index value such as sequential letter or number.

7. The method of claim 3, wherein each multi-layer double-sided adhesive pad sheet has a color and the tab is of a corresponding color.

8. The method of claim 3, wherein each tab includes other means of indicating that it is the corresponding tab for the layer to be removed.

\* \* \* \* \*